March 10, 1959  R. C. McDOWELL ET AL  2,876,489
COMBINATION SYSTEM OF MIXING MATERIALS
AND DEEP SINTER BED CHARGING
Filed Nov. 13, 1956  5 Sheets-Sheet 1

INVENTOR.
ROBERT C. McDOWELL &
BY THOMAS E. BAN
Justin W. Macklin,
ATT'Y

INVENTORS
ROBERT C. M<sup>c</sup>DOWELL &
THOMAS E. BAN.

INVENTORS
ROBERT C. McDOWELL &
THOMAS E. BAN
BY

INVENTOR.
ROBERT C. McDOWELL &
BY THOMAS F. BAN

United States Patent Office 2,876,489
Patented Mar. 10, 1959

2,876,489

COMBINATION SYSTEM OF MIXING MATERIALS AND DEEP SINTER BED CHARGING

Robert C. McDowell, Lakewood, and Thomas E. Ban, Warrensville Heights, Ohio, assignors to McDowell Company, Inc., Cleveland, Ohio, a corporation of Ohio Application November 13, 1956, Serial No. 621,747

10 Claims. (Cl. 18—1)

This invention relates to a system including the method steps and apparatus for combining finely divided loose materials in predetermined proportions, and the thorough mixing of the same while forming a composition of a physical nature suitable for feeding to and forming a bed of this mixed material on the traveling grates of a sintering machine. The present sytsem includes the method and means for delivering and distributing the material onto the sintering machine pallets in a novel manner to form a deep bed of uniformly permeable material for updraft or downdraft sintering operations.

The system contemplates the preparing of finely divided materials of different ingredients, delivering them to a common mixing means, there mixing and blending the solids with a controlled and proportioned amount of liquid, and continuously or periodically introducing the loose material into a turbulent mixing zone or mass of the material and then delivering the intermingled ingredients from the mixing means to a distributing and bed forming means at the sintering machine.

The invention is useful in many fields, and in the treatment of materials for various products to be sintered, such as concentrates, limes, metallic ores, including lead, zinc, iron, and many others, and non-metallic fines and materials such as clays, shales, limestone, cement, and other materials in finely divided or powdered form some of which have been heretofore wasted or lost in the processing thereof.

The complete mixing and sintering system carrying out the steps above indicated may comprise the combination of means for storing selected finely divided materials, means for delivering them from the storage means in predetermined quantities to a mixing means, and means for adding the necessary moisture or liquid to the mixture while being subjected to the mixing action.

A preferred type of mixing apparatus is shown, described and claimed in the application of McDowell, Ban and Gambon, Serial No. 565,639, filed February 15, 1956. Other comparable mixing and pelletizing apparatus such as hereinafter referred to may be used.

The system also includes novel means for delivering and conveying the mixed material to a sintering machine and for there uniformly depositing and distributing the material in a deep bed on the moving pallets or grates, where it is subjected to a burning or sintering treatment.

The system may include apparatus for carrying out the steps of gathering mixed material from two, three or more mixing devices, and for similarly distributing it onto the sintering machine pallets.

The distributing step forming the bed on the pallets of the sintering machine operates to build up the deep bed thereon in a uniform, composite arrangement of small particles and larger pellets or lumps, whereby the passage of air or gas may be effective uniformly throughout the bed from side to side, and along its length, without varying resistance to the flow in different areas or different portions thereof.

In this connection, the spreading and distributing of the material to form the bed on the sintering machine is carried out in a novel manner to avoid dropping the material a distance sufficient to cause it to pack and form compact, impervious clusters or bodies on the bed. The distributing means further carries out the step of preventing the rolling and gathering of larger and smaller particles into different horizontal zones, with the resultant deleterious effect of impairing the free flow of air or gas through the bed to be sintered.

The means for effectively and efficiently operating the combined supplying and transporting of the different ingredients to the individual mixing device or devices, and the handling of large quantities continuously, preferably includes control means governing the quantities delivered to the mixing apparatus from suitable storage containers. Likewise, the supplying of water in the form of a spray at desired positions onto and into the mass being mixed is subject to precise regulation in quantity. The means for continuously opearting the conveyor feeding means, and regulating speeds from the storage means to the mixing means, and thence to the distributing means, are all correlated and integrated as to speed of operation and quantity of material being treated.

Such a complete apparatus may be known as a mixing and aggregating system, including the sintering machine, which is preferably of the Dwight-Lloyd type.

Prior to final delivery of the sintered or indurated, mixed product, gases other than air may be used in certain steps. However, the sintering process steps are not a part of the present invention.

The essence of the invention of the present system comprises the feeding of predetermined quantities of granular (or powdered) material, the mixing and aggregating means, and the distributing onto and forming of the bed of materials on the grates or pallets of the sintering machine, all designed and arranged for successful commercial operation in the continuous production of large quantities of any given or selected materials to be so combined, mixed and sintered.

A coordinated group of cooperating elements comprising an illustrative plant for carrying out the steps of this system is shown in the accompanying drawings, in which:

Fig. 9 is an elevation of the distributing mechanism indicating associated parts in fragmentary section, and taken on a plane indicated by the lines 9—9 of Fig. 6;

Figure 1:
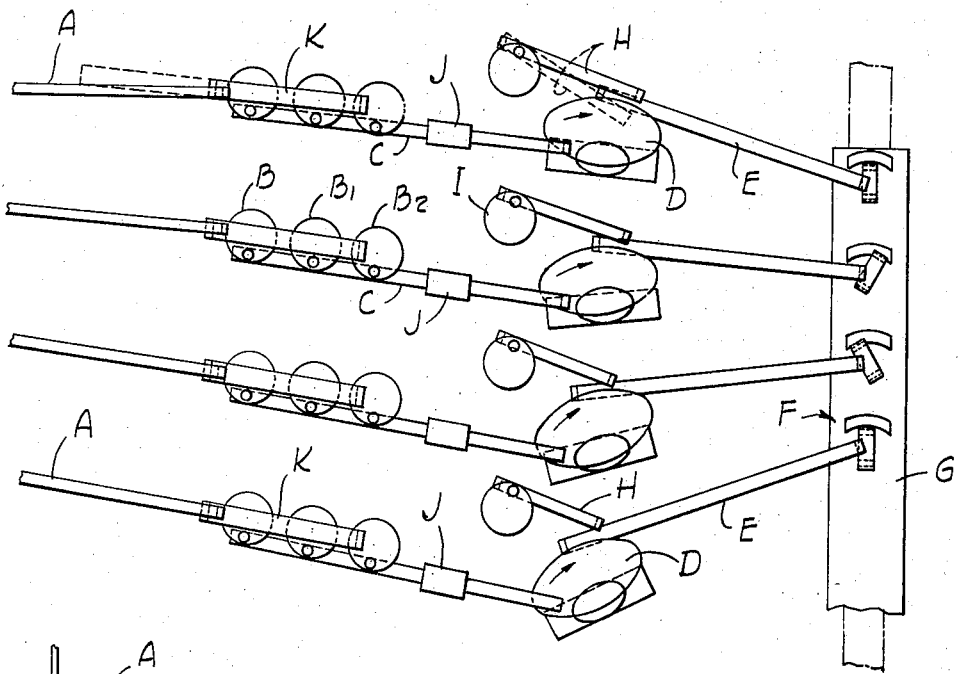
Fig. 1 is a diagrammatic plan view illustrating a plurality of storage feeders, mixers, and distributing means delivering the material to the sintering machine.

Referring to the drawings, storage bins B, B¹ and B² (Figs. 1 and 2) deliver loose granular materials onto belt conveyors C leading to the several mixing apparatus, each indicated at D. From these mixers, belt conveyors E lead to distributing and feeding devices, indicated generally at F, delivering the material to the bed of a sintering machine, designated G. At H are indicated supplementary feeder belts which may be sometimes used when desired to bring still another or supplementary finely divided or powdered ingredients from storage bins I to the material being mixed in the apparatus D.

Figure 2:
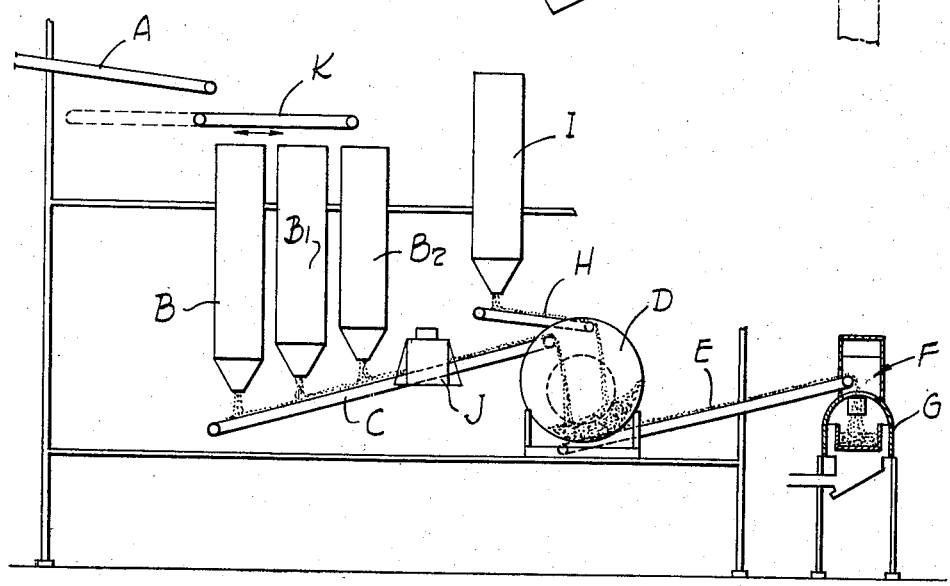
Fig. 2 is an elevational view, which may be assumed to be partly in section, showing an arrangement of storage bins, feeding conveyors, regulating means, mixing means, and the means for delivery and distribution to a sintering machine.

The control of the feed from the bins to the belts C and H may be manually regulated, or may be automatically governed in response to the control of belt-weighing devices, such as indicated at J in Figs. 1 and 2.

Figure 5:
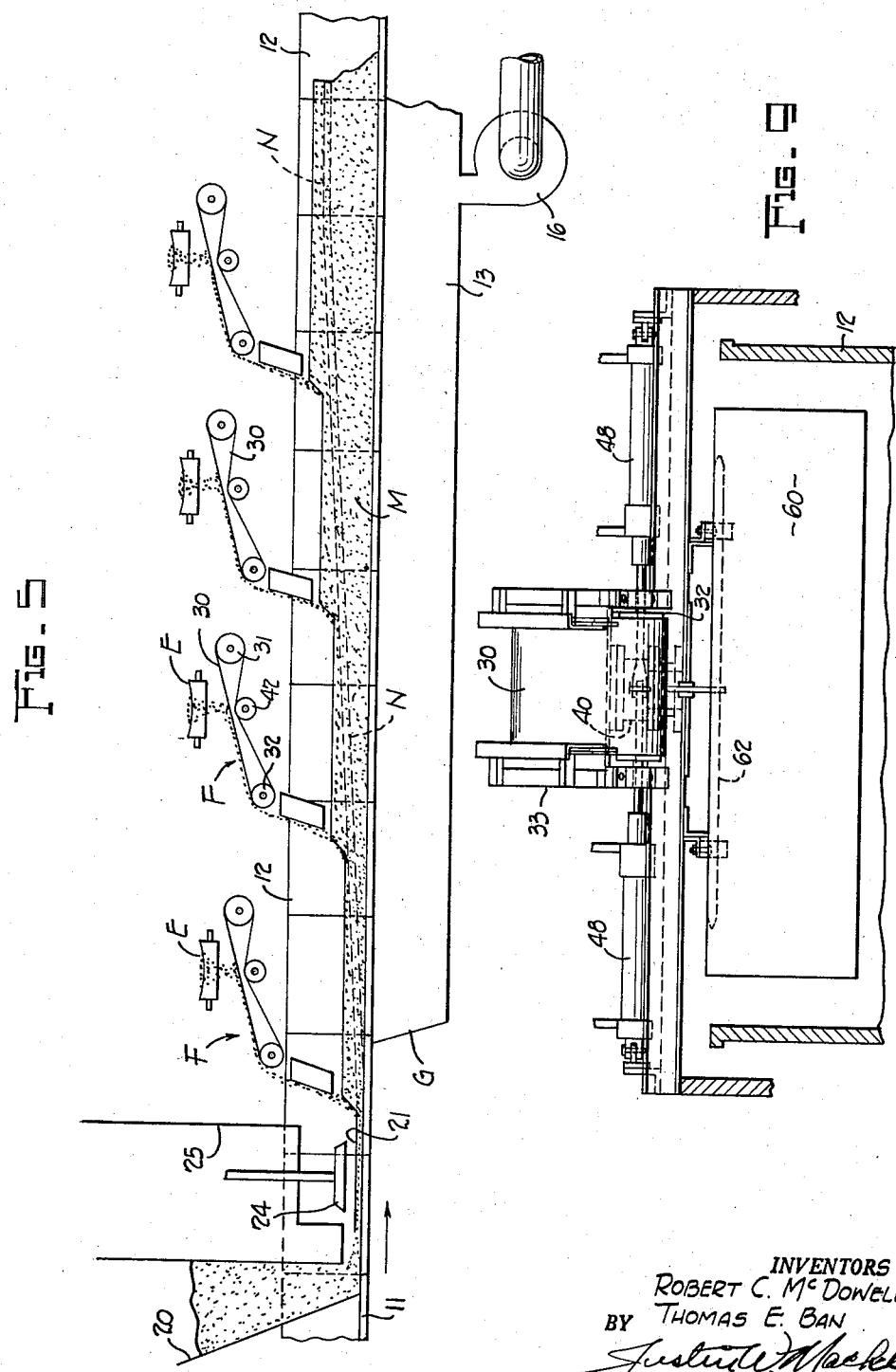
Fig. 5 is a diagrammatic elevational view showing the bed of material on the grates of a sintering machine, and illustrating the formation of the bed by a plurality of material feeding and distributing means.
Figure 6:
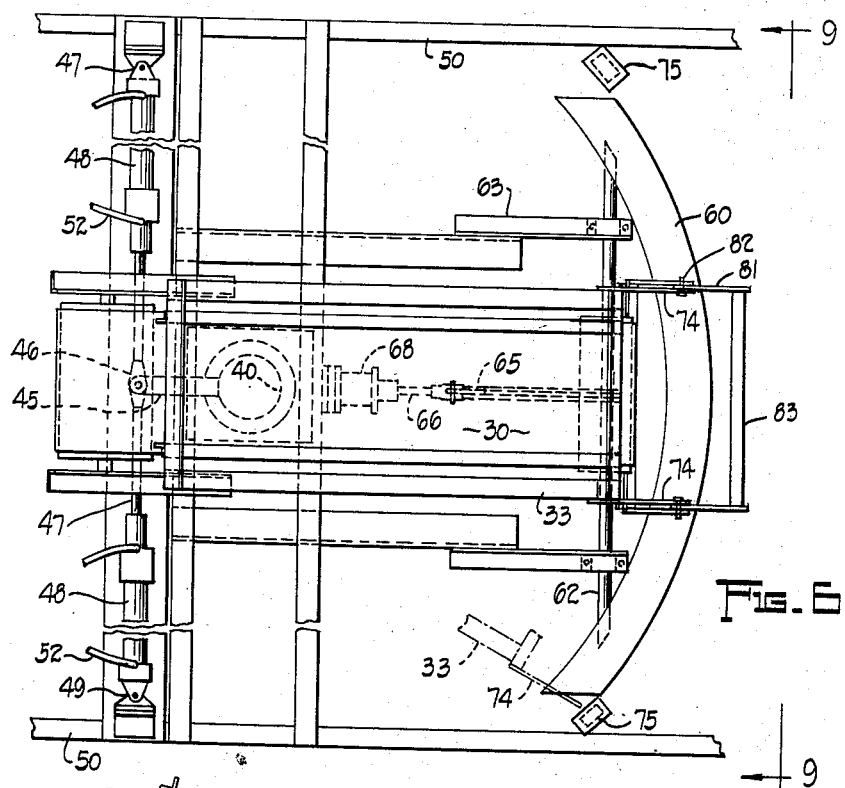
Fig. 6 is a view similar to Fig. 4 on a somewhat enlarged scale, showing the distributing, oscillating belt in a different position.
Figure 7:
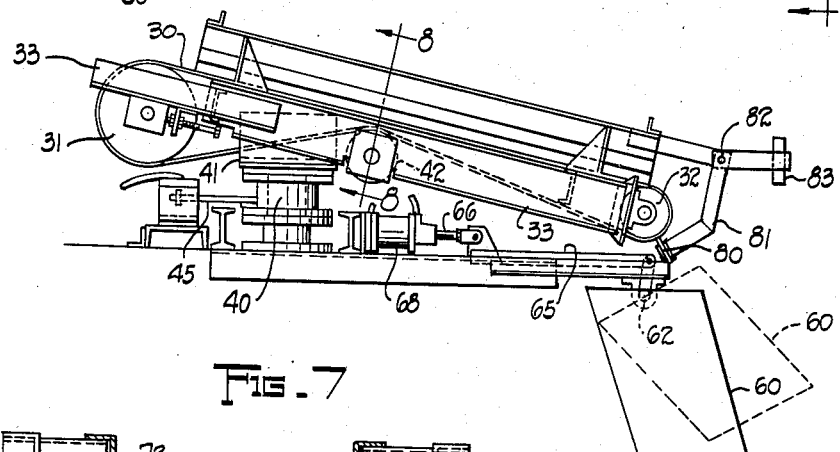
Fig. 7 is a side elevation of the parts shown in Fig. 6.
Figure 8:
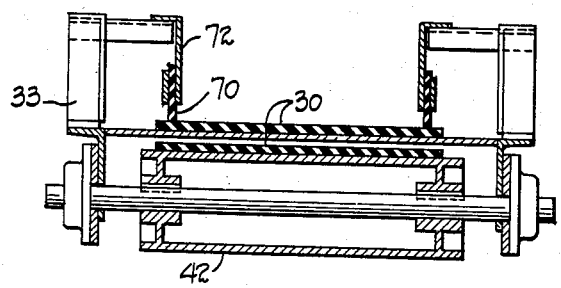
Fig. 8 is a sectional view taken on the plane indicated by the line 8—8 of Fig. 7.

In Figs. 1 and 5, a plurality of feeding and mixing devices are shown, it being intended to illustrate that the capacity of a large sintering machine may be fully utilized, and also to illustrate the manner of building successive layers of the bed of mixed material to be sintered on the sintering grates, as appears particularly in Fig. 5.

In the operation of each group of units, namely the storage, mixing, and feeding, it may be assumed, for example, that any of the materials such as mentioned above are fed in controlled quantities from one, two or more storage bins to a conveying belt C leading to a mixer D. Here, additional materials may be added from the storage bin or supply container I onto the belt H, which may be so mounted as to be swung into position to feed into the saucer or disk or pan-shaped mixing device. The mixed material is suitably moistened, or additionally moistened, as may be required, and is then delivered to a belt E and thence to one of the means both distributing and controlling the fall of the material onto the grates of the sintering machine.

Any suitable means may be provided for loading the several storage bins B, B¹, and B² with the predetermined several materials.

The main feeder belt A may bring the material to a belt K which is longitudinally shiftable so that it may be positioned to discharge into any one of the three storage bins of the group over which it is positioned. Obviously, any means of filling the storage bins I or the other storage bins need not be treated as a part of the system of the present invention.

Likewise, the means for controlling delivery from the storage bins under either manual or automatic control of devices for weighing the material as it passes along the belt, to govern and assure the proportions delivered to the mixing device and thence to the sintering machine, may be of well known types, such as shown in Biehler Patent No. 2,533,710, for "Integrating Mechanism," dated December 12, 1950. As mentioned, the sintering machine is the Dwight-Lloyd type which employs a continuous contacting succession of moving pallets with means for effecting forced air and/or gas flow, as may be desired, for the sintering operation appropriate to suitably treat the product for the desired end result.

Figures 3, 4:
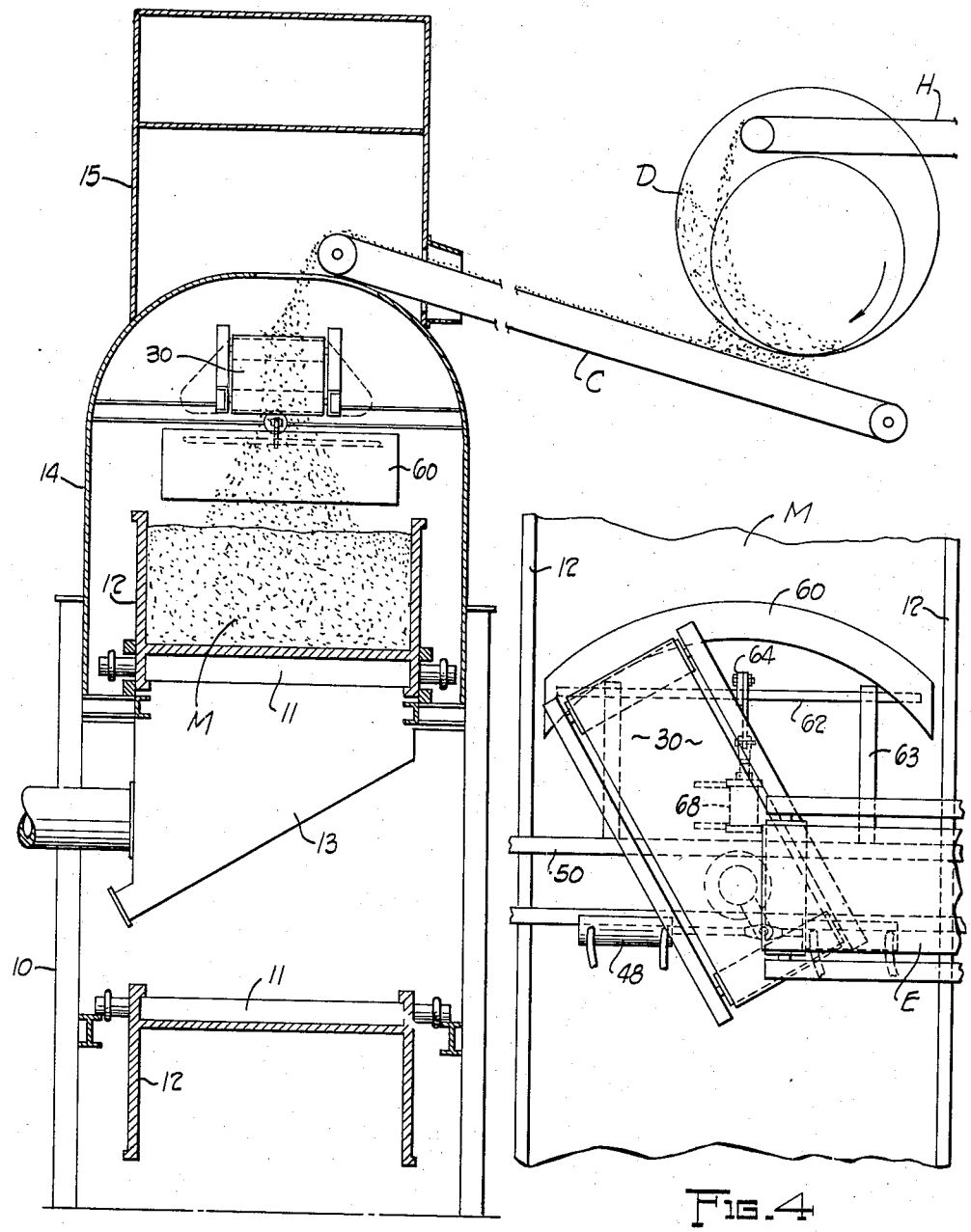
Fig. 3 is an enlarged sectional view of a sintering machine illustrating the feeding and distributing means delivering the material thereto.
Fig. 4 is a plan view of the material distributing means and illustrating an oscillating belt and swinging baffle.

Referring particularly to Figs. 3 and 5, such a sintering machine comprises a suitable frame 10 having rails and guiding means for pallets comprising grates 11 and side walls 12, wind box structures indicated at 13, and a hood or hood members 14 and 15. The wind box 13 is shown diagrammatically in Fig. 5. Air may be brought to the wind box, or may be drawn from it by a fan, indicated at 16. The hood portion 14 is omitted, for convenience, from Fig. 5.

At the left-hand portion of Fig. 5 is indicated a hopper 20 serving to deliver prepared material to form a layer such as indicated at 21, which layer of material may be ignited by an inverted burner 24 positioned in a suitable hood 25 above the machine.

The bed of material being sintered is indicated at M in Fig. 5. This bed of material is shown in this figure as being built up in a plurality of steps. The first material distributing apparatus at F at the left-hand side of Fig. 5 may deposit the material to a predetermined depth, governed by the rate of delivery with relation to the rate of movement of the traveling pallets, the next material distributing apparatus delivering a comparable amount and building the bed to a distance say twice the height or thickness; while the third and fourth, toward the right, add similar thickness to the full desired depth of the bed.

In the sintering operation illustrated, the layer of material ignited at 21 is caused to burn in a thin, incandescent zone, indicated by the close, parallel, broken lines N in Fig. 5, which progresses upwardly through the moving bed toward the top thereof, as indicated by the position of these parallel broken lines at the right of the figure, until the burning action of the controlled sintering operation is completed.

The function of the final delivering and distributing devices is to discharge the material over moving baffles, effecting a spread of the material and retarding its fall, while the final delivery belts swing to move their discharge ends in an arc from side to side across the width of the bed of material being formed between the side walls 12 of the pallets.

Such a material distributing means for delivering the material to the sintering machine pallets is shown in detail in Figs. 4 and 6 to 9. The novel arrangement there shown is an illustrative mechanism which may function to deliver the material, as indicated above, with minimum dropping impact, while deflecting the falling stream of material in varying amounts, longitudinally of the direction of the slowly moving path of the bed, and while shifting the stream from side to side to form a layer of moist, discrete, uniformly distributed small and larger components, whereby the bed of the mixed material to be sintered may be built up without packing the material or otherwise rendering it relatively impervious to the flow of air or gas at any portion or zone of the bed.

The distributing device shown comprises a relatively short conveyor belt 30 running over rollers 31 and 32 mounted in a frame 33, one of which rollers is drivingly connected with a motor (not shown). The frame 33 comprises side members and cross members, and is pivotally carried on a supporting turntable like bearing, indicated at 40, having a laterally extending upper portion 41 secured to the side members of the frame, while a roller 42, engaging the lower reach of the belt, is positioned to deflect it upwardly over this pivot support. This arrangement permits lowering the upper reach of the belt and allows the belt frame to be oscillated about the axis of the pivotal support 40, swinging its lower forward end from side to side.

Means for swinging the belt frame, and thus the belt, is illustrated as an arm 45 rigid with a rotating bearing portion of a support 40 and connected at 46 to plunger rods 47 of pneumatic cylinders 48, each indicated as pivoted at 49 to a main supporting frame 50. Tubes for supplying actuating fluid to the cylinders 48 are indicated at 52.

It will be seen that the belts 30 slope toward their delivery end, and, as shown in Fig. 4, the conveyor belts E are each positioned to deliver material to their belt 30 substantially over the supporting king pin or turntable pivot 40. Thus, the material is delivered to the belt at a relatively non-swinging zone from which it moves toward the discharge end during its side-to-side swinging movement.

It is well known that if loose material, composed of fine and coarser components, ranging from granular particles to discrete balls or pellets of substantial diameter (say, for example, ¼" or ½", or much larger lumps), is delivered to a pile of such material, the larger particles or lumps roll down the slope of the angle of repose more easily than the smaller particles. The result here would be that at any one delivering zone, such as appears in Fig. 5, the sloping face of the pile or layer being formed would have the larger particles accumulated near the bottom of the zone or layer, while small particles would tend to remain at the top.

This segregation of the smaller particles at the top of each layer has been found to unavoidably form a horizontal zone or strata of much finer and smaller interstices than the lower part of the horizontal zone or pile. Such an undesirable formation, which is avoided by the use of the present distributing mechanism, is illustrated diagrammatically in Fig. 12.

Figure 12:
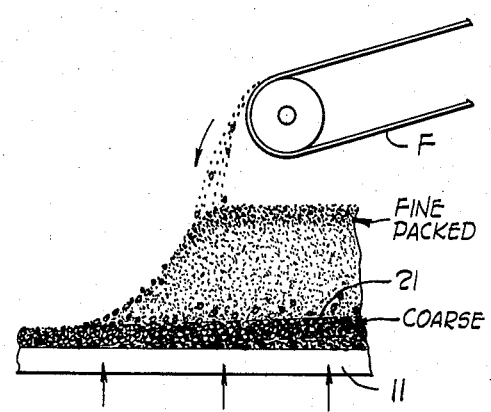
Fig. 12 is a diagrammatic, fragmentary, sectional view illustrating the previously encountered undesirable distribution of material in which fine particles pack at the top and coarser particles gather at the bottom of a layer of the sinter bed.

Referring briefly to this Fig. 12, it will be noted that the upper portion of the zone is illustrated as composed of a strata of the relatively fine particles, while the middle portion may be somewhat graded, increasing in size of particles toward the bottom. At the left of the slope are indicated the positions normally taken by the larger lumps, which become the bottom zone of the layer or step formed at each delivery point.

It will be noted that the angle of repose toward the lower left of this figure is less than the relatively steeper angle formed by the finer particles at the upper part of the slope.

It has been found in practice that these fine particles so segregated tend to pack and merge in a fashion such as to form a layer of the material which is relatively impervous, or at least highly resistant, to the flow of air or gas.

Figure 13:
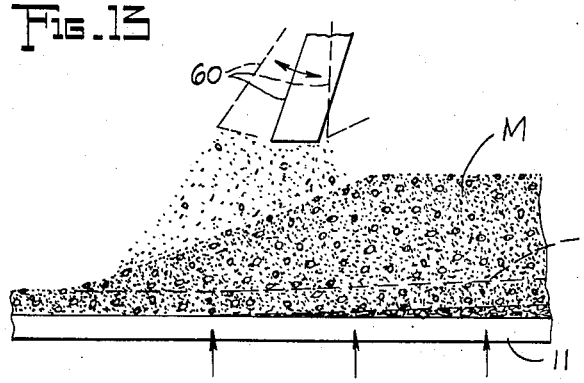
Fig. 13 is a similar view illustrating the desired uniform distribution of the fine and coarse particles and components of the charge forming the bed as attained by the distributing means of the present invention.

The more desirable condition attained by the present invention is similarly diagrammatically illustrated in Fig. 13, where the large and small particles which have been intermingled up to the point where they leave the belt 30 have been distributed forwardly and backwardly with relation to the sloping face of the pile forming the layer, and thus, the large and small constituent particles, pellets, and lumps are uniformly intermingled.

We have found that this desirable result may be obtained by engaging and deflecting the material in its fall while at the same time continuously changing the trajectory of the falling stream of particles from the belt forwardly and backwardly with relation to the bed being formed.

To minimize falling impact onto the bed, it is obviously desirable to deliver the material as closely as possible to the bed. Thus, distortion of the individual discrete elements, particles or lumps, with consequent packing of the moist material, may be largely avoided.

To this end, it is preferred to deliver the material to the bed in a plurality of successive layers or zones, whereby the distance of fall for each zone is reduced to a minimum, in accordance with the arrangement shown in Fig. 5.

In this connection, it may be noted that other means of distribution, from the thin lower layer at the bottom of the bed to the top of the bed, may be employed, such as that illustrated in the pending patent application of Robert C. McDowell, Serial No. 577,137, filed April 9, 1956, for "Method and Apparatus for Deep-Bed Charging of Traveling Grates."

In the present illustration, the means for preventing the segregation of, and effecting a distribution of, the falling material, while deflecting it in its fall and thus impeding or slowing the rate of the drop or fall of the particles, has been shown as an arcuate sloping deflector plate 60, extending substantially from side to side between the side walls 12 of the grates. This plate 60 is shown as secured to and thus carried on the ends over a shaft 62 supported in forwardly extending members 63 of the frame 50. This shaft 62 is provided with a crank arm 64 and a link 65 with a fluid pressure actuating cylinder and piston connected with the plunger rod of the fluid actuating cylinder, indicated at 68, rigid with the frame. The rod 66 may be reciprocated by pressure fluid supplied from any suitable source, thus swinging the deflector 60 at a rate of oscillation suitable to accomplish the desired distribution, and in relation to the relatively slow motion of travel of the sintering machine grates.

Preferably, this deflector oscillates forwardly and backwardly several times during each lateral swinging motion of the belt 30 on its frame 33. Guides for the material extending longitudinally of the upper reach of the belt 30 may comprise resilient strips 70 contacting the upper reach of belt near its sides and supported by suitable plates 72 (see Fig. 8), so that as the belt 30 and its frame swing from side to side, the material is not thrown off laterally but is confined on the belt until delivered therefrom.

Projecting forwardly from the frame carrying the belt 30 are trip bars (one being shown at 74, Fig. 6) for actuating limit switches, indicated diagrammatically at 75, these switches being electrically connected to a solenoid operated valve or other control means, not shown, for reversing the flow of actuating fluid, such as air, to the cylinders 48.

Inasmuch as such controls may be of any suitable selected standard devices, they are not shown.

A scraper may be used to clean the belt, such, for example, as the resilient strip 80 carried on arms 81 which swing about a pivot 82. A weight, indicated at 83, may hold the scraper against the belt, and may be swung upwardly and rearwardly to hold the scraper in idle position.

Referring again to the storage supply for material to be fed to the mixing device or devices, obviously, other arrangements for bringing different ingredients in measured quantities to the mixers may be utilized. For example, a number of belts, such as C and H, may all bring material to a common mixer, and a number of such groups of delivery belts, each leading from its individual storage container or source of material, may deliver to a plurality of mixers, i. e., each group supplying a common mixer.

In the arrangement shown in Figs. 1 and 2, the smaller supplementary belt H is indicated as being capable of being swung into and out of idle position (see upper portion of Fig. 1). The function of such a belt may be that of bringing an added material not desired to be so thoroughly intermingled in the particles and lumps or pellets being formed, but rather to coat them and/or only partially intermingle therewith.

As previously stated, control of rate of flow and quantity of material from storage means to each mixer may be automatically controlled. To this end, weighing apparatus, positioned as at J, may be associated with any or all of the several conveyor belts leading to the mixers and connected with feed control means.

A novel preferred form of the revolving material mixers indicated generally at D in Figs. 1, 2 and 3, particularly suitable for use in the present system, and which has been found most satisfactory for mixing many kinds of materials, is that shown, described and claimed in the application for patent of McDowell, Ban and Gambon, Ser. No. 565,639, filed February 15, 1956, entitled "Method and Apparatus for Making Pellets."

Other novel forms of mixing apparatus which may be used in the present system are shown, described and claimed in the prior patent application of McDowell and Gambon, Ser. No. 568,628, filed February 29, 1956, entitled "Apparatus for Making Nodules or Pellets," and in the application of Gambon and Rowen, Ser. No. 569,919, filed March 6, 1956, entitled "Pelletizing Apparatus."

While the titles of said last three mentioned prior patent applications suggest that the several forms of apparatus disclosed in them are primarily useful for pelletizing, actually each such apparatus has proven very satisfactory for the mixing of finely divided materials according to, and as required in carrying out the present system.

Essentially, each of these devices constitutes a large, sloping, rotating, substantially flat disk having a circular wall preferably with an outwardly extending flared portion constituting a revolving mixing vessel.

Figure 10:
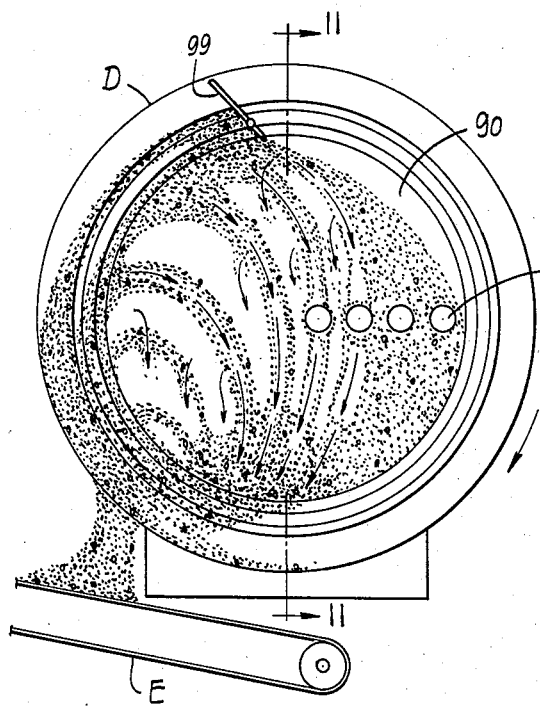
Fig. 10 is a somewhat diagrammatic face view of the revolving material mixing means illustrating the rolling, cascading, and mixing motions of the material on the large sloping rotating disk vessel with a side wall perimeter having a special formation.
Figure 11:
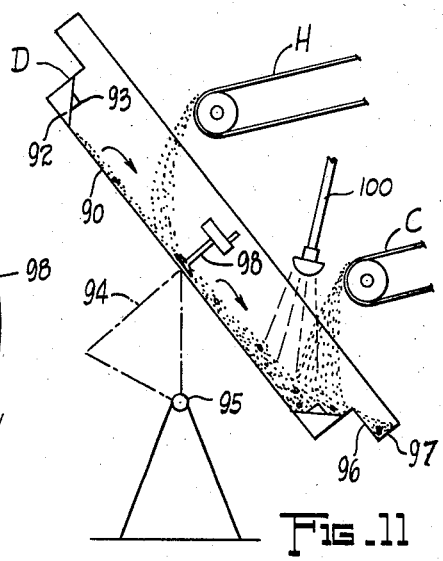
Fig. 11 is a diagrammatic view in the nature of a cross section through the sloping disk vessel mixing means taken substantially on the line 11—11 of Fig. 10 and also further illustrating the rolling and cascading movement of the materials being mixed.

In Figs. 10 and 11, we have conventionally illustrated a rotary sloping disk with a specially formed perimeter wall corresponding somewhat to the structure shown, described and claimed in said application of McDowell, Ban and Gambon, Serial No. 565,639, above mentioned. As there diagrammatically shown, a large sloping circular disk bottom 90 is rigid with an outwardly sloping or conical side wall portion 92, having a concentric intermediate rib or step 93, beyond which is another step to outwardly extending portion 96 and a shallow, substantially cylindrical rim 97. This structure forms a shallow disk bottom vessel, which is mounted to rotate upon an axis indicated by the broken line 94, and which may be tilted to adjust its angle of slope about a pivot indicated at 95 on a suitable support. At 98 are indicated stirrers or mixers which may be moved in a generally radial direction to distribute and limit the packing of material on the surface, while at 99 is indicated a deflecting scraper preferably located at an angle with relation to the diameter approximately as shown in Fig. 10.

At 100 is indicated a controlled water supply pipe having a spray head for directing water or other liquid onto the mass of material being mixed therein. The material is brought to the revolving, mixing vessel by a belt C, preferably discharging somewhat against the disk in the lower portion thereof. The material accumulates and piles to a substantial depth in the lower portion of the revolving disk, which, as viewed in Fig. 10, is rotating in a clockwise direction. The material is carried upwardly and outwardly rolled over the step portions somewhat, and falls downwardly over intervening thin layers and masses, generally in the curved paths indicated by the arrows between illustrative rows. It should be understood, however, that these arrows and rows, as shown, indicate paths of particles, although the cascading and rolling mass spreads uninterruptedly over the disk bottom. A portion of the mass is carried upwardly toward the top where it may be deflected by the scraper or baffle 99, the rotation causing some of the material to move well to the right of the disk in a relatively thin layer, and it is stirred and distributed by the moving scraper members 98.

While rotary disk and cone structures such as those of the above-identified applications are very effective in forming pellets of the mixed materials, and even of delivering controlled sizes of pellets, it is to be understood that in carrying out the present invention, the thorough mixing of the selected ingredients is the primary purpose. However, it is not objectionable, but is, in fact, advantageous that in the course of such mixing some of the material so subjected to the rotating and cascading action, while spraying water thereon, will agglomerate, some of it forming small "seedling" pellets, while some of the material will form larger lumps or pellets, all of which, however, constitute bodies of the composite material thoroughly mixed and blended in the desired proportions.

The mixing by the use of a revolving, sloping disk bottom vessel, of the general type illustrated in Figs. 10 and 11, has been found to be much more effective than mixing of such materials by pug-mill or so-called "ribbon mixing," in that the incoming fresh material is immediately intermingled with material already subjected to rolling, tumbling, and cascading action, and whereby what we may term "back-mixing" is effected.

By way of comparison, material passing through a pug-mill, for example, however thoroughly stirred therein, nevertheless is moving somewhat after the manner of a column, and the resultant material delivered therefrom may have unmixed or partially mixed masses or zones, due to the fact that one kind of material entering the mill ahead of another kind is not thrown backward into and thoroughly stirred into the succeeding material or materials, which, if accomplished, would be, in effect, a "back-mixing" action.

Continuous operation of a complete system such as here disclosed obviously is not suited to the use of batch mixing, as, for example, by a concrete mixer type of apparatus.

By the present system and mixing apparatus, relatively unmixed materials may be continuously fed to the rotating sloping disk bottom vessel, and there the tumbling and mixing action definitely assures the uniform intermingling of materials previously reaching the vessel with materials subsequently reaching the vessel, and of being there subjected to the turbulent intermixing action before being continuously delivered therefrom. The aptness of the term "back-mixing" is thus apparent. It may be of practical interest that it has been found that the pelletizing apparatus of the prior applications referred to may continuously deliver thoroughly mixed material in the form described in quantities far exceeding the tonnage possible to be delivered where substantially uniform size pellets are required to be formed thereby.

The unique and novel functional operations and results of the use particularly of the very large, flat, sloping, rotating disk with a conical wall and with a concentric step or steps formed therein is more specifically illustrated and described in another application of the present inventors filed October 18, 1956, Serial No. 616,814, and related hereto.

The varying sizes of particles and granular material and discrete aggregates of the "mix" delivered from each mixing apparatus D, distributed, as described, to the pallets of the sintering machine, and forming the deep bed thereon, will constitute a pervious mass having substantially uniform distribution of its physical components and interstices, permitting the desired uniform flow of air or gas.

In the distribution of the material onto the bed of the sintering machine, certain conditions of moisture content, particle formation and softness of the pellets or lumps, may not be suitable for subjection to the distance of fall and impinging oscillation of the baffle of the distributing device described. A sloping belt delivery device, such as that of the McDowell application, Serial No. 577,137, above mentioned, may be used, avoiding many of the difficulties in handling of the deep bed charging of the traveling grates.

From the foregoing description, it will be seen that the system comprises correlated component parts of an apparatus including the storing and delivering of predetermined quantities of selected ingredients in finely divided form to a mixer or mixers where effective intermingling and aggregation of these materials are effected.

From the mixer or mixers the material in the form of small particles and larger accreted masses of material is delivered continuously to conveying means delivering it, as by the belt or belts E, to the distributing means at the sintering machine.

As indicated, it is clearly important that the distributed physical arrangement of the constituent particles, pellets and lumps be maintained in the deep bed formation, from side to side and bottom to top, in the sintering machine pallets. By the arrangement described, the uneven distribution, packing, filling of the voids and interstices between larger particles, and the layering and packing of the finely divided particles, any of which would obviously prevent the desired uniform flow of air and gas, and which would inhibit the desired rapid rates of heat transfer and interaction of the gases and solids during the operation, are successfully avoided.

From the illustration and description, it will be seen that the mixed materials, in a physical form desirable for depositing on and forming the bed of the sintering machine, are prevented, by the distributing mechanism, from dropping far and packing.

More particularly, it is apparent that we have assured that for each part of the bed, i. e., each zone from the lower to the upper layers, the material is distributed evenly from side to side, and is caused to fall gently over zones extending a distance longitudinally of the bed to be sintered, and at such an angle of repose that the larger particles do not tend to roll downwardly over the sloping edge or newly formed part of the bed; and neither do the smaller particles tend to gather at the upper portion thereof, which, if allowed to occur (as illustrated in Fig. 12), would prevent the uniform mixture of the constituent physical components and would create sharply defined stratifications with corresponding resistance to the desired flow of the air or gas during the sintering.

In summary, it may be added that the essence of the invention consists in bringing together finely divided materials in precisely predetermined measured amounts; subjecting them to an effective and efficient mixing and agglomerating operation; delivering the mixed particles to the sintering machine; and there evenly distributing the material and forming a bed structure such as illustrated in Fig. 13, effectively preventing the layering of alternately coarse and fine particles by means such as the longitudinal oscillating motion imparted to the falling stream of material, or by the other methods mentioned.

Having thus described our invention, we claim:

1. An apparatus of the character described, comprising a plurality of storage bins for finely divided materials of different character to be combined and mixed, conveyor means and means for controlling delivery of predetermined amounts of the different materials to the conveyor means, a mixing device receiving the materials from said conveyor means, a second conveyor means receiving material from the mixing device, a sintering machine having moving baffle extending substantially from side to side of the from the second-named conveyor means and comprising a third conveyor and means for mounting and oscillating the third conveyor to deliver material from side to side on the moving pallets of the sintering machine, an arcuate sloping baffle extending substantially from side to side of the pallets of the sintering machine and curved to conform to the arcuate path of the discharge end of the third oscillating conveyor means.

2. The apparatus defined in claim 1 in which the arcuate sloping baffle extending from side to side of the pallets of the sintering machine and has a height extending a substantial portion of the distance between the discharge end of the oscillating belt and the top surface of the deposited material on the sintering machine and adapted to deflect and retard the fall of material.

3. The apparatus defined in claim 1 in which the arcuate baffle extending from side to side of the pallets of the sintering machine and positioned to deflect material delivered from the third conveyor means, and is provided with means for oscillating the baffle to effect longitudinal distribution of the material.

4. The apparatus defined in claim 1 in which the third-mentioned conveyor means is a conveyor belt, means for pivotally mounting the belt to swing transversely with relation to the sintering machine pallets, means for effecting a number of oscillating motions forwardly and backwardly of the arcuate baffle with relation to the sintering machine during each lateral oscillating movement of the third conveyor belt delivering material thereto.

5. An apparatus as defined in claim 1 in which a weighing device is positioned to be responsive to the amount of material being transported on the first-mentioned conveyor, and means are provided for controlling the amounts of material delivered from the storage bins to said belt and in relation to the desired mixing action of the mixing device.

6. An apparatus of the character described including a plurality of storage bins for different kinds of selected materials in finely divided form, a mixing device, and means for effecting delivery to the mixing device from said storage means in predetermined proportions, means for delivering the material from the mixing device to the moving pallets of a sintering machine to form a deep bed thereon, the mixing device acting to form an agglomerated mixture of constituents of various sizes of the mixed material, and distributing means for forming a deep bed of the material on the sintering machine, in which the various sizes of constituent parts are uniformly distributed from side to side and from top to bottom of the bed as the sintering machine pallets move, said distributing means comprising a sloping conveyor belt, a frame supporting the same, a pivot supporting the frame, means for oscillating the belt and frame from side to side of the sinter bed being formed, means for retaining the material on the belt during its travel thereon, and means extending a considerable portion of the distance from said oscillating belt and the top surface of the material being deposited on the sintering machine and deflecting and retarding the fall of the material while distributing it longitudinally with relation to the path of movement of the sintering machine pallets.

7. An apparatus of the character defined in claim 6 in which a plurality of groups of storage bins and conveyors are arranged to deliver material to a plurality of mixers, and a plurality of delivery means leading to the sintering machines, and in which is provided a distributing means for each of the latter delivery means, whereby the deep bed is built up in a plurality of layers of substantially equal depth on the pallets of the sintering machine.

8. The apparatus defined in claim 6 in which scraper means are provided for cleaning the distributing conveyor belt.

9. The apparatus defined in claim 6 in which the means deflecting and retarding the fall of the material is a sloping baffle pivoted to oscillate on an axis extending transversely of the sinter bed being formed, and means for effecting such oscillation in the path of the falling material.

10. An apparatus for blending and mixing different finely divided materials to form agglomerates of a combination of the materials in predetermined ratio and to form a deep pervious sinter bed thereof, the apparatus comprising means for transporting materials in predetermined amounts and continuously delivering them at a common point, a rotating vessel positioned at said common point for receiving the materials, the rotation of the vessel serving to mix and agglomerate the materials to form constituents of small discrete and larger particles and pellets of the combined materials, means for spraying the materials with water in predetermined amounts, means for delivering the materials so mixed and agglomerated from the rotating vessel, and means for distributing the materials in uniformly intermingled arrangement of its small and larger constituents onto the bed of a sintering machine while substantially preserving the sizes of the particles the same as that at which they were delivered from said vessel, said distributing means including a conveyor belt mounted to oscillate transversely of its length and baffle means positioned to extend transversely of the bed of the sintering machine and between said belt and the sintering machine bed.

(References on following page)

References Cited in the file of this patent

UNITED STATES PATENTS

| | | |
|---|---|---|
| 1,926,044 | Gonser | Sept. 12, 1933 |
| 2,052,329 | Wendeborn | Aug. 29, 1936 |
| 2,343,270 | Agnew | Mar. 7, 1944 |
| 2,409,378 | Morgan | Oct. 15, 1946 |
| 2,533,710 | Biehler | Dec. 12, 1950 |
| 2,539,070 | Gebo | Jan. 23, 1951 |
| 2,696,432 | Davis | Dec. 7, 1954 |

FOREIGN PATENTS

| | | |
|---|---|---|
| 461,465 | Canada | Nov. 29, 1949 |
| 516,007 | Canada | Aug. 23, 1955 |
| 915,072 | Germany | July 15, 1954 |

OTHER REFERENCES

American Institute of Mining and Metallurgical Engineers, Preprint for the Blast Furnace, Coke Oven, and Raw Materials Conference, Apr. 12–13, 1948, pages 1–3.

UNITED STATES PATENT OFFICE
CERTIFICATE OF CORRECTION

Patent No. 2,876,489                              March 10, 1959

Robert C. McDowell et al.

It is hereby certified that error appears in the above numbered patent requiring correction and that the said Letters Patent should read as corrected below.

Column 9, line 48, beginning with "baffle extending" strike out all to and including "conveyor means.", in line 56, same column 9, and insert instead the following:

> pallets, and a distributing means receiving
> material from the second-named conveyor means
> and comprising a third conveyor and means for
> mounting and oscillating the third conveyor
> to deliver material from side to side on the
> moving pallets of the sintering machine, an
> arcuate sloping baffle extending substantially
> from side to side of the pallets of the sinter-
> ing machine and curved to conform to the
> arcuate path of the discharge end of the third
> oscillating conveyor means.

Signed and sealed this 19th day of May 1964.

(SEAL)
Attest:

ERNEST W. SWIDER                              EDWARD J. BRENNER
Attesting Officer                              Commissioner of Patents